(No Model.)
A. H. PATCH.
HARROW.
No. 316,648. Patented Apr. 28, 1885.
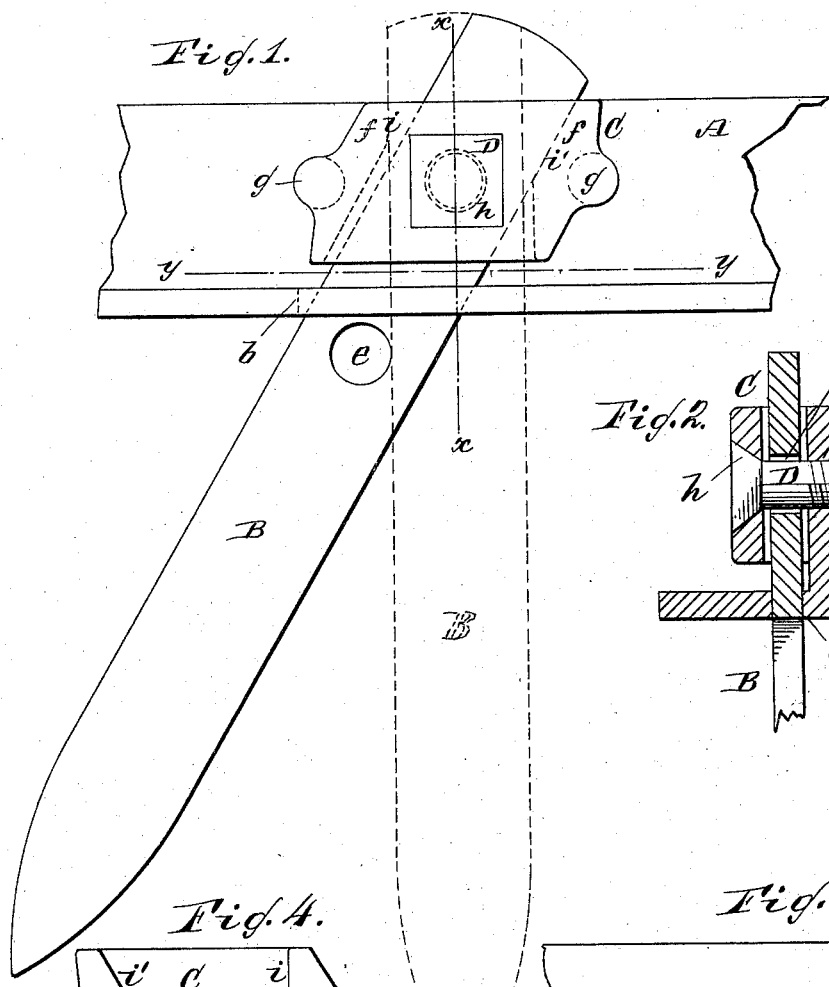
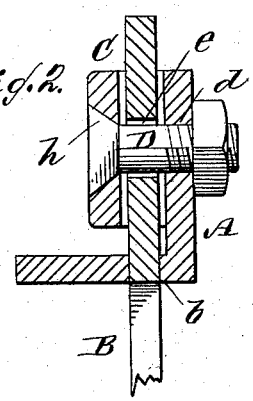
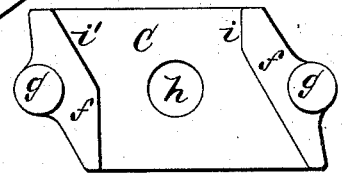
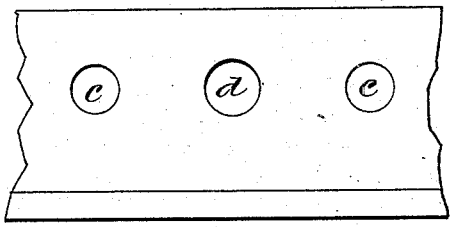
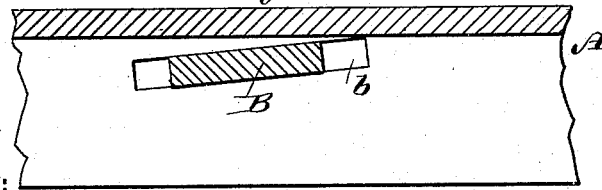
WITNESSES:
Theo. G. Hoster
C. Sedgwick
INVENTOR:
A. H. Patch
BY Munn & Co
ATTORNEYS.

UNITED STATES PATENT OFFICE.

ASAHEL H. PATCH, OF CLARKSVILLE, TENNESSEE.

HARROW.

SPECIFICATION forming part of Letters Patent No. 316,648, dated April 28, 1885.

Application filed December 27, 1884. (No model.)

*To all whom it may concern:*

Be it known that I, ASAHEL H. PATCH, of Clarksville, in the county of Montgomery and State of Tennessee, have invented a new and useful Improvement in Harrows, of which the following is a full, clear, and exact description.

The object of my invention is to produce a harrow with adjustable teeth which shall be light, strong, durable, cheap, and effective in every kind of work required of the implement, that may be made up of any number of sections. By the term "adjustable teeth" is meant teeth which, as in the case of certain other harrows, are attached by pivots to admit of them assuming either a vertical or inclined position, according to the direction in which the harrow travels; and my invention consists in a combination, with either beam of a harrow-frame made of steel or angle-iron, which may either be of L or inverted-T shape, and is slotted for reception and adjustment of the teeth through it, of teeth perforated near their upper ends, and clamps or plates provided with lugs for attachment to the beam and constructed to form upper bearings for the teeth in both their vertical and slanting positions, while the slots in the beam may form the lower bearings therefor. The teeth are attached with provision for swinging, as required, by a bolt which passes through the clamp-tooth and angle-beam, and serves to secure the clamp and form a pivot for the tooth, but is relieved from all working or lateral strain by the bearings hereinafter described for the tooth.

Reference is to be had to the accompanying drawings, forming a part of this specification, in which similar letters of reference indicate corresponding parts in all the figures.

Figure 1 represents a side view of one of the beams of a harrow-frame in part, with an adjustable tooth, and the holding plate or clamp, all in accordance with my invention. Fig. 2 is a sectional view on the line $x\,x$ in Fig. 1; Fig. 3, a side view of the beam in part; Fig. 4, an inside view of the clamp, and Fig. 5 a horizontal section on the line $y\,y$ in Fig. 1.

A is one of the angle-iron or metal beams, in part of the harrow-frame, used to carry the teeth. The lower flange of the beam has a longitudinal slot, $b$, in it for each tooth, B, and which may either be in line with the beam or slightly diagonal thereto, and should be of a length to allow of the tooth vibrating from an upright to an inclined position, or vice versa, and so that the slot will form not only a lateral support for the tooth, but also a lower support thereto in both of its working positions. These slots, as also three holes, $c\,c\,d$, arranged at suitable distances apart along the beam in the upper flange or web thereof and above the slot for attachment of the clamp C, may all be made by punching with a press.

The tooth B, which passes through the slot $b$, may be a flat or other shaped one, twisted or not, and has one or more holes, $e$, made through it near the upper end.

The clamp C, used to hold the tooth in either of its working positions, is a simple plate having bent inner ends, $f\,f$, and lugs $g\,g$, which latter enter the holes $c\,c$ in the beam, and may or may not be riveted to the beam. It is further or may be wholly secured to the beam, subject to the steadying action of the legs, by a bolt, D, arranged to pass through a center hole, $h$, in the clamp, through either one of the holes $e$ of the tooth, and through the hole $d$ in the beam, and forming the pivot on which the tooth turns. The bent ends $f$ of the said clamp are made, the one of them with an upright inner side surface, $i$, and the other of them with an inclined inner side surface, $i'$, the same forming upper bearings alternately above the pivot D for the tooth in the inclined and vertical positions shown for it by full and dotted lines in Fig. 1. This forms a light, strong, durable, cheap, and effective construction, requiring no special means to adjust the teeth, and relieves the pivots on which the teeth swing from working or lateral strain, as well as provides for a ready detachment of the teeth when required, the same bolt which secures each clamp also serving as a pivot for the tooth.

Having thus fully described my invention, I claim as new and desire to secure by Letters Patent—

In a harrow having teeth capable of adjustment into vertical and inclined or different positions, according to the direction in travel of the harrow, the combination, with the angle metal beam A, having a longitudinal slot, $b$, for each tooth, of the tooth B, provided with one or more upper apertures, $e$, the clamp C, constructed to form bearings for the swinging tooth to relieve it of working or lateral friction on its pivot, also provided with lugs $g$, that engage with the beam, and the bolt D, substantially as specified.

ASAHEL H. PATCH.

Witnesses:
B. A. PATCH,
SARAH M. PATCH.